Dec. 31, 1940.  G. S. SCHMIDT  2,226,876

STORM RIM

Filed April 14, 1939  2 Sheets-Sheet 1

Witnesses:
C. E. Wessels
Janet McKay

Inventor,
George S. Schmidt,
By Joshua R H Potts
his Attorney.

Dec. 31, 1940.         G. S. SCHMIDT         2,226,876
STORM RIM
Filed April 14, 1939         2 Sheets-Sheet 2

Witnesses:
C. E. Wessels
Janet McKay

Inventor;
George S. Schmidt,
By Joshua R. H. Pott
his Attorney.

Patented Dec. 31, 1940

2,226,876

UNITED STATES PATENT OFFICE 2,226,876

STORM RIM

George S. Schmidt, Elizabeth, Ill.

Application April 14, 1939, Serial No. 267,782

9 Claims. (Cl. 295—1)

This invention relates to storm rims for the drive wheels of motor cars such as used by maintenance men for signal maintenance, bridge gangs, section gangs and line men on railroads.

The object of the invention is to provide an emergency rim to be placed on the drive wheels of such motor cars in case of ice or snow on the rails, at which time it is impossible to run a motor car with steel wheels due to the fact that they slip and the snow rolls under them.

At times during inclement weather when ice or snow collects on the rails of a railway roadbed, it is essential in many emergencies that trips be made over the trackage for the proper maintenance of signals, repairs and the like of the roadbed and in many instances, it has been impossible to run the ordinary motor cars so that other transportation or even walking must be resorted to with considerable loss in time and tying up of traffic, together with the many other disadvantages and delays especially in cases of emergencies as where there has been a collision or accident and, of course, with much loss of life and revenue. Especially has this been true when ice or snow collects on the rails.

The present invention provides novel, simple, light-weight and efficient storm rims adapted for quick application to and removal from the drive wheels of motor cars so as to furnish the proper traction necessary to run the cars to any destination within a minimum of time and without slippage on the rails, the device being readily adaptable to all sizes of motor car wheels and providing a rim which is to a railway motor car with ice or snow on the rails what chains are to an automobile in similar inclement weather or in mud and capable of being carried on a car as part of its equipment to be placed on the wheels quickly and as easily removed.

A further object of the invention is to provide a storm rim which is inexpensive to make and which will give years of efficient service and apply to various types of rail wheels with a tapered or slanting tread or a tread which is parallel to the rail, and which can apply to wheels in which the brakes work on the rim and tire or anti-skid band thereof or on the flanges of the wheels.

Other objects and advantages will appear and be brought out more fully hereinafter, reference being had to the accompanying drawings, wherein.

Figure 1:
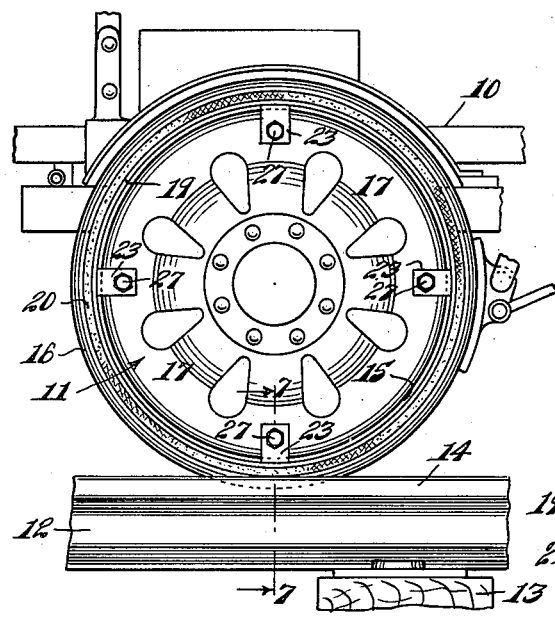
Fig. 1 is a side elevation of the storm rim applied to the wheel of a motor car, a portion of which is shown.
Figure 3:
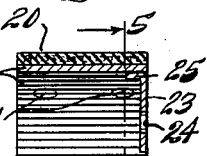
Fig. 3 is an enlarged section taken on the line 3—3 of Fig. 2.
Figure 2:
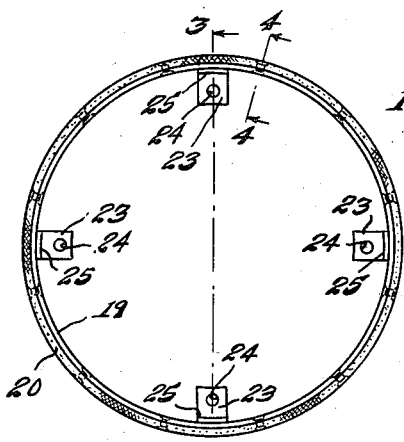
Fig. 2 is a side elevation of the rim looking at the inside and as removed from the wheel.
Figure 5:
Fig. 5 is a fragmentary section taken on the line 5—5 of Fig. 3.
Figure 4:
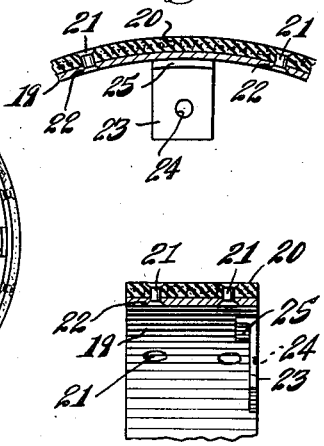
Fig. 4 is a similar view taken on the line 4—4 of Fig. 2.
Figure 6:
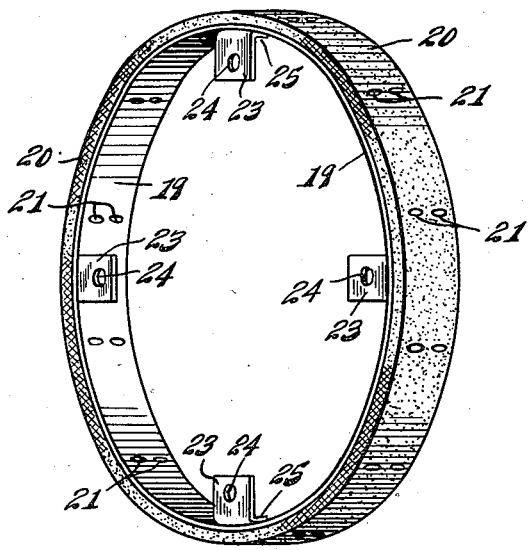
Fig. 6 is a perspective view of the storm rim looking toward the outside.
Figure 7:
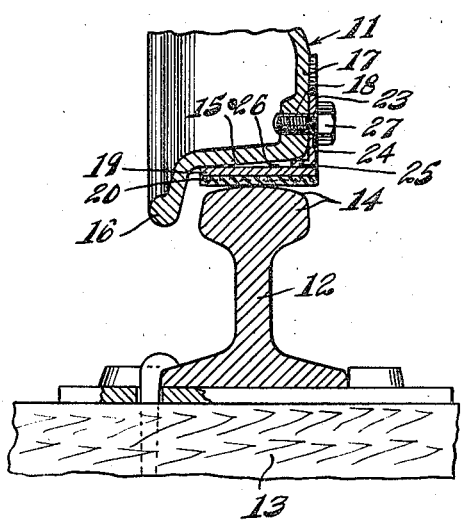
Fig. 7 is an enlarged sectional view through the wheel, rim and rail taken on the line 7—7 of Fig. 1.

Referring more particularly to the drawings, 10 designates a motor car which may be of any of the various types as used by maintenance men or repair gangs on railways and 11 is one of the drive wheels which may be of the usual or any preferred type but which is shown as a stamped or pressed sheet metal wheel connected to the usual drive axle at the hub thereof and shown provided with openings forming spokes. 12 indicates a rail mounted on the ties 13 and 14 is the tread, head or ball of the rail which is usually slightly convex on top. The wheel is shown provided with a slanting or tapered tread 15 and a retaining flange 16 which in some instances in connection with modern practice is used for the application of the brakes. The wheel has an outer lateral or side wall flange or disc 17 preferably thickened adjacent the wheel tread and provided with a plurality, preferably four or more equidistantly spaced tapped holes 18 through the thickened portion, the disc being substantially at right angles to the tread and the holes parallel or slightly tangent thereto.

The rim comprises an annular ring 19 of suitable formation but shown of uniform diameter and thickness and made of steel or iron of the proper size to fit standard drive wheels of motor cars. To this rim, an anti-skid band or tire 20 is applied, the rim having a plurality of sets of holes 22 preferably arranged in equidistantly spaced pairs to take rivets or other securing means 21 which are shown upset or headed and countersunk in the inner face of the rim and the outer face of the band or tire. This band or tire is preferably of fabric rubber somewhat like belting and of four or more plies, being a vulcanized composition of rubber and cord or other equivalent reinforcement giving a rough tread surface which will efficiently grip the rails when covered with ice or snow and furnish traction which will propel any motor car when driven. While such composition tire has been found most efficient and is preferred, I desire to use all rubber or cord or similar band or any suitable reinforcement for the rubber which will give a rough friction surface to grip the rails and insure proper traction on ice or snow, whether such material is woven or otherwise formed into interstices and whether entirely of cord, fabric or metal such as wire mesh or other foraminous material or combination thereof.

The rim may be detachably mounted on the wheel in any suitable way so that the rim 19 and its anti-skid band or tire 20 lie wholly and a considerable distance below the projection of the flange 16 of the car or drive wheel 11, but preferably by means of angular lugs or brackets, welded to or formed integral with the rim but shown as separate elements separately pressed or formed from the rim and having long legs 23 at the outside of the wheels at right angles to the rim and at the outer edge of the latter, each having an aperture 24 and a short leg 25 at right angles thereto extended inwardly and welded, riveted or otherwise secured to the rim 19 at equidistantly located points around the inside of the same. As illustrated, four of such lugs or brackets are shown in which the short legs 25 extend between the tread of the wheel and the rim to fill the space 26 therebetween at the outside of the wheel and thus dispose the rim and its anti-skid band or tire parallel to the rail and the top tread surface thereof with the rim 19 and band 20 wholly and a considerable distance below the flange 16 of the car or drive wheel 11. The long legs 23 extend outwardly of the face of the wheel at the disc portion thereof to align the apertures 24 with the tapped holes 18 for the reception of stud or cap screws 27, or other suitable fastening means for quickly and detachably securing the rim in position or to permit its quick removal when not needed.

Figure 8:
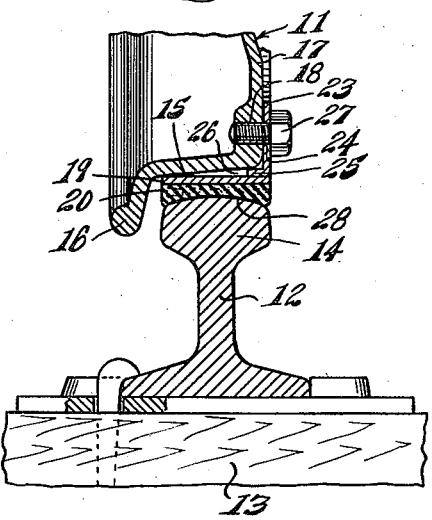
Fig. 8 is a view similar to Fig. 7, showing a modification.

In the form of the invention shown in Fig. 8 of the drawings, the construction is the same as previously described except that the anti-skid band or tire on the rim is shown provided with a transversely concaved tread surface 28 to fit the ball of the rail and insure greater surface contact and thus increased traction. In modern practice, it is becoming a custom to apply the brakes to the flanges 16 of the wheels but for general purposes, the brakes as shown in Fig. 1 of the drawings may be applied directly to the antiskid tire with efficiency. On some motor cars, all wheels are drive wheels and the brakes may be applied to some or all of the wheels to act directly against the tires or when the latter are removed, to apply directly to the peripheries of the metallic wheels, when the storm rim is not in use. Owing to the gripping surfaces provided, the rim will run on the ice or snow encrusted on the rails and alleviate a long standing expensive and constant annoyance in cases of maintenance and emergencies on rails where it is necessary to get the motor cars over the tracks and insure against tying up traffic as well as to obviate the necessity of employing other methods of transportation or even walking, especially during storms without particular trouble. By this means, the difficulty heretofore experienced, owing to the impossibility of moving the cars over the rails with the ordinary metal wheels, will be entirely eliminated and the expense incident thereto is trivial.

A particular action taking effect between the rubber or cushioning material of the anti-skid band or tire and the fabric, interwoven or foraminous material thereof and imbedded therein, particularly where said material is of cord or cloth fabric, is that due to the different properties of the material and the greater flexibility or compressibility of the rubber or similar compressible material, there will be a kneading or relative movement between the rubber and fabric which will serve to give a maximum gripping effect or traction on the ice or snow encrusted on the treads of the rails.

While I have illustrated and described the preferred form of construction for carrying my invention into effect, these are capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent, is:

1. In a storm rim for flanged railway motor car wheels, a circular band having an anti-skid tread of fabric rubber adapted to fit over and around the wheel tread so as to lie a considerable distance below the car wheel flange and means at the outside of the band on at least one edge for detachably mounting the band on a wheel.

2. A storm rim for flanged motor car wheels comprising a metallic band adapted to fit on the periphery of a car wheel and disc having lugs, means to detachably connect the lugs to at least one side of the wheel and having portions extending between the periphery of the car wheel and the inner surface of the band and an anti-skid tread on the band so as to lie a considerable distance below the car wheel flange.

3. A storm rim for flanged motor car wheels comprising a metallic band having lugs substantially normal thereto, means to detachably connect the lugs to the side of the wheel and an anti-skid tread on the band lying within the flange of the car wheel, said lugs disposing said band and tread parallel to a rail.

4. A storm rim for flanged railway motor car wheels comprising a metallic band having lugs, means to detachably connect the lugs to the wheel and an anti-skid tread on the band lying within the flange of the car wheel, said tread having a transversely concaved surface to engage and conform to the ball of a railway rail.

5. In a storm rim for flanged car wheels, a metallic band of uniform thickness to form a space of tapered cross section between the same and a car wheel tread when mounted on the latter, an anti-skid tread on the band and having embedded anti-skid fabric lying wholly below the projection of the car wheel flange, and means in said space at spaced intervals and connected to the side of the wheel to hold the tread parallel to a rail tread and secure the band to the wheel.

6. A storm rim for flanged railway motor car wheels comprising a thin metallic flangeless band having an anti-skid tread composed of materials of different compressibility riveted thereto, said band being spaced from the tread of the wheel adjacent the outside and lying below the usual flange of the car wheel and means for detachably securing the band to the wheel at said side fitting and filling said space and bracing the band with the wheel tread at said space.

7. A storm rim for railway motor car wheels comprising a thin metallic flangeless band of uniform cross section having an anti-skid tread composed of soft materials of different compressibility riveted thereto at a plurality of spaced points transversely and circumferentially and adapted to lie wholly below the flange of the car wheel to which applied, said band being spaced from the tread of the wheel adjacent the outside and spaced means for detachably securing the band to the wheel at said side, said means fitting in and filling said space at such points to brace the band with the wheel tread at said space and disposing the rim tangentially to the wheel tread and parallel to the tread of a rail.

8. In an anti-skid rim for flanged car wheels having a slanting tread, a metallic band of uniform thickness to form a space of tapered cross section between the same and a car wheel tread when mounted on the latter, an anti-skid tread secured on the band and adapted to lie wholly beneath the flange of the wheel, and means in said space at spaced intervals and connected to the outside of the wheel to hold the tread parallel to a rail tread and detachably secure the band to the wheel.

9. An anti-skid storm rim for railway motor car wheels having a flanged tapered tread and a thin outer wall provided with thickened portions adjacent the tread and provided with tapped holes, comprising an annular band, an anti-skid tread riveted to the band and composed of soft flexible material and fabric material embedded therein, right-angular brackets having leg portions extending inwardly and secured to the band to fill the space between the band and the tread at the outer portion of the latter and legs extending radially at the outside in contact with the outer wall and having apertures aligned with the tapped holes, and cap screws disposed through the apertures and engaged with the holes to detachably secure the rim to the wheel below the flange thereof.

GEORGE S. SCHMIDT.